United States Patent
Cvetkovich

[15] 3,682,195
[45] Aug. 8, 1972

[54] WHEEL LOCK FOR A VEHICLE
[72] Inventor: Dejan O. Cvetkovich, 10044 San Juan Court, Fountain Valley, Calif. 92708
[22] Filed: Aug. 28, 1970
[21] Appl. No.: 67,713

[52] U.S. Cl. ...............137/384.6, 137/598, 303/89, 188/353
[51] Int. Cl. .......................F16k 35/06, F16d 65/32
[58] Field of Search ..........137/384.6, 598; 188/353; 303/89

[56] References Cited

UNITED STATES PATENTS 2,307,644  1/1943  Schlumbrecht et al....188/353
3,116,752  1/1964  Duncan..................137/384.6

*Primary Examiner*—Henry T. Klinksiek
*Attorney*—Philip M. Hinderstein

[57] ABSTRACT

A wheel lock designed for vehicle theft prevention and comprising valve means interposed in the brake fluid line to at least one wheel brake cylinder of the vehicle. Turning a key-lock operated camshaft urges the valve means toward the closed position, blocking fluid flow through the brake line. By simultaneously or subsequently depressing the vehicle brake pedal, brake fluid under pressure opens the valve means; when the pedal then is released, the valve means closes to trap pressurized fluid between the wheel lock and the brake cylinder, thereby locking the wheels. The valve means thereafter remains closed, with the wheels locked, until disengaged by key.

4 Claims, 4 Drawing Figures

Patented Aug. 8, 1972
3,682,195
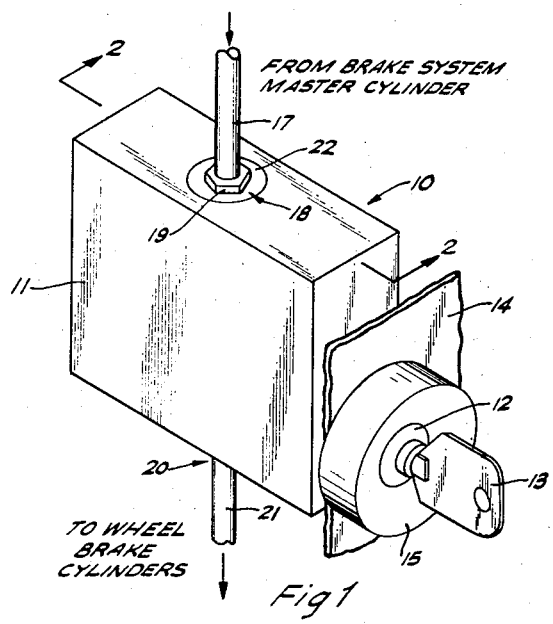
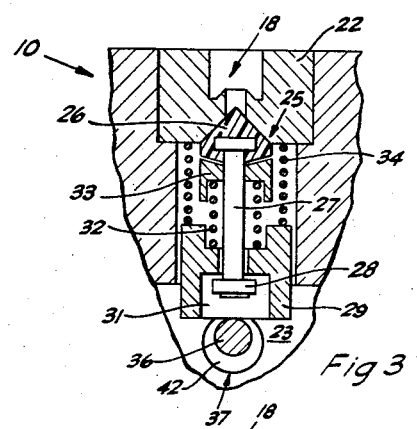
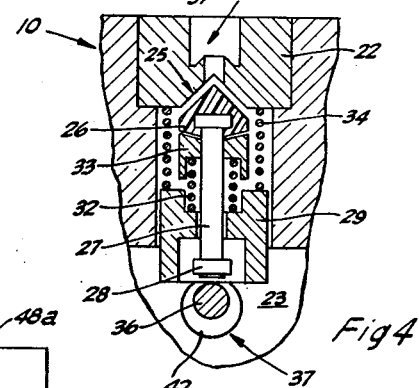
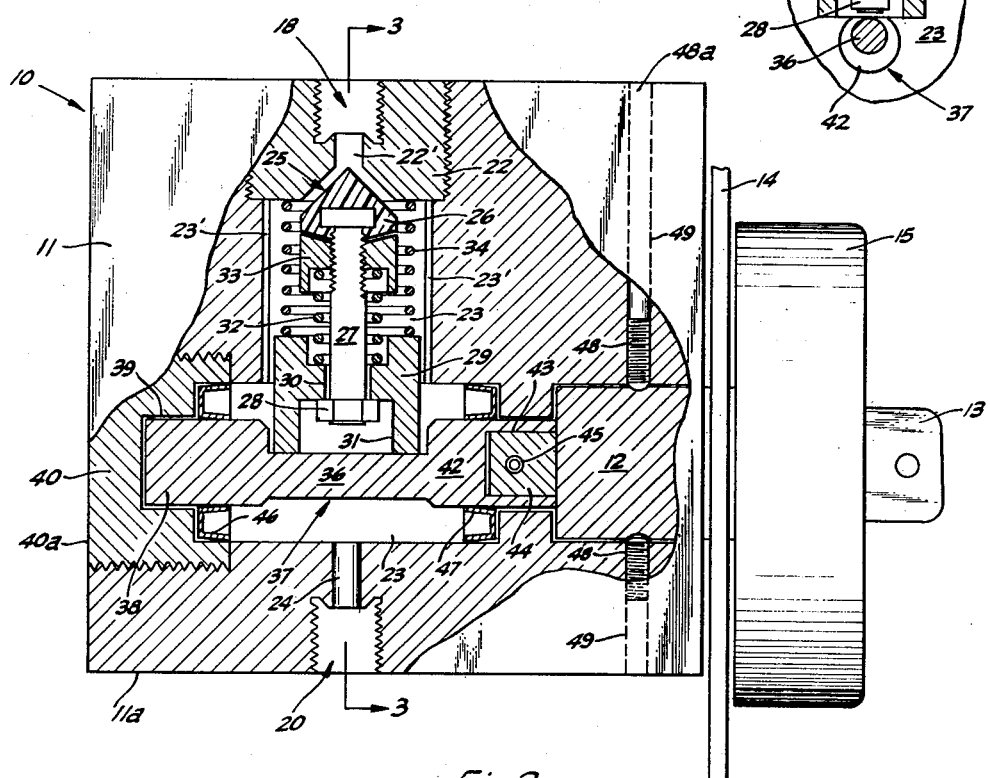
INVENTOR.
DEJAN O. CVETKOVICH
BY
Henderstein & Silber
ATTORNEYS

WHEEL LOCK FOR A VEHICLE

BACKGROUND OF THE INVENTION

1. Field of the Invention

The present invention relates to an improved wheel lock designed for theft prevention of a vehicle having a fluid brake system. More particularly, the invention relates to a wheel lock comprising key operated valve means interposed in the brake fluid line to at least one wheel brake of the vehicle, and capable of trapping brake fluid under pressure between the valve means and the brake cylinder to lock the wheels.

2. Description of the Prior Art

Whether for joy riding or with criminal intent, the number of automobiles stolen each year continues to increase. The problem is a serious one, not only for inconvenience to the vehicle owner and the drain on police manpower, but also because of the danger resulting from unlicensed, unskilled operators driving the stolen vehicles on the roadway. Moreover, such stolen vehicles, particularly when stripped by the thief, represent a significant loss to the vehicle insurer.

The concern raised over the increasing number of stolen vehicles in recent years has led automobile manufacturers and others to incorporate theft prevention devices in vehicles. For example, audible alarms have been utilized to indicate that the ignition key has been left in the lock after the engine has been turned off and the car door opened. This feature has reduced the likelihood of leaving an ignition key in the car, and thus made it necessary that the person stealing the car jumper or "hot wire" the ignition to start the car. While this is some deterrent to automobile thievery, the ignition system is relatively easy to jumper, and a considerable number of automobiles still are stolen in this manner.

Another approach has been to provide a mechanical lock for the steering shaft and transmission, the lock being actuated as the ignition key is rotated to the off position. This approach if effective in that it prevents the automobile from being driven even though the engine may be started by jumpering the ignition system. However, complex mechanical arrangements are required to accomplish the locking action, thereby adding significantly to the cost of the vehicle. Moreover, such systems are not tamperproof, can be broken easily and are costly to repair.

The inventor's related, copending U. S. application Ser. No. 6,246 discloses an inexpensive theft deterrent device which readily can be installed on new or used vehicles and which will prevent the vehicle from being driven, even though the engine has been turned on. That device comprises a tamperproof wheel lock for a vehicle having a fluid brake system. The device prevents theft by making it impossible to roll or propel the vehicle on its own wheels when the wheel lock has been engaged. The present application discloses an improved wheel lock which is similar in application and benefits, but is somewhat simpler in design than the device disclosed in the inventor's copending application.

The present invention offers a further advantage not available in the past. In one mode of operation, when the device is engaged using a key, the vehicle wheels are not immediately locked. However, the vehicle wheels will lock the first time the brake pedal is depressed. Thus, if engaged without brake depression, a thief may start to drive away with a vehicle, but as soon as he applies the vehicle brakes, the wheels will be locked and he will go no further.

SUMMARY OF THE INVENTION

In accordance with the present invention, there is provided a wheel lock designed for theft prevention of a vehicle having a fluid brake system. The wheel lock comprises key-operated valve means interposed in the brake fluid line to at least one wheel brake of the vehicle. By closing the valve means, and simultaneously or subsequently depressing the vehicle brake pedal, brake fluid under pressure is trapped between the valve and the brake cylinder, locking the wheels.

In a preferred embodiment, the wheel lock is enclosed in a unitary housing. An inlet, an outlet and a chamber in the housing facilitate brake fluid flow through the device under control of a valve comprising a valve seat communicating with the inlet and a piston attached to a piston rod having a flanged member at the other end thereof. A support movably surrounds the piston rod with the flanged member disposed within a recess in the support. A first bias spring surrounds the rod and extends between the piston and the support. A second bias spring extends between the valve seat and the support. A rotary camshaft, operated by a key-lock extending from the housing, urges the support, first spring and piston between a valve closing position and a valve opening position.

When the camshaft is turned to the valve closing position, the support and first spring bias the piston against the valve seat. If the vehicle brake pedal is simultaneously or subsequently depressed, the greater pressure on the inlet side will cause the piston and rod to move longitudinally of the support, thereby opening the valve and permitting passage of brake fluid under pressure. When the brake pedal thereafter is released, the valve piston will be shut tightly against the valve seat, trapping brake pressure under fluid between the closed valve and the brake cylinder, thereby locking the wheels and preventing the vehicle from being driven or moved on its own wheels. The valve will remain shut, with the wheels locked, until opened by key-lock rotation of the camshaft and depression of the brake pedal to equalize substantially the pressure on both sides of the valve.

Thus it is an object of the present invention to provide an improved wheel lock for a vehicle.

It is another object of the present invention to provide a device for locking the wheels of a vehicle and including key-lock operated valve means interposed in the fluid line of a vehicle fluid brake system and operative, upon depression of the vehicle brake pedal simultaneous with or subsequent to key-actuation of the device, to trap brake fluid under pressure between the device and the vehicle wheel brake cylinder, thus locking the vehicle wheel.

BRIEF DESCRIPTION OF THE DRAWINGS

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

FIG. 1 is a perspective view of a vehicle wheel lock in accordance with the present invention, showing interconnections to the brake fluid line of the associated vehicle;

FIG. 2 is a sectional view of the inventive wheel lock as seen generally along the line 2—2 in FIG. 1, with the camshaft oriented in the valve opening position;

FIG. 3 is a sectional view of the inventive wheel lock as seen generally along the line 3—3 of FIG. 2, but with the camshaft shown in the valve closing position and with the valve closed; and FIG. 4 is a sectional view of the wheel lock also as seen generally along the line 3—3 of FIG. 2, and shown with the camshaft in valve closing position but with the valve open.

DESCRIPTION OF THE PREFERRED EMBODIMENT

Referring now to the drawings, and particularly to FIG. 1 thereof, there is shown a wheel lock 10 designed for theft prevention of a vehicle having a fluid brake system. As seen therein, wheel lock 10 includes a housing 11 extending from which is a pick-proof, rotary, key-operated lock 12. A key 13 is shown inserted in lock 12 so as to permit actuation of wheel lock 10; key 13 is removable and normally would be withdrawn from lock 12 after engaging or disengaging wheel lock 10.

Wheel lock 10 typically may be installed through an automobile dashboard panel 14, the device being maintained in place by means of a fastening ring 15 which threadingly engages the periphery of lock 12.

Wheel lock 10 is connected operatively in series with the brake fluid line to one or more wheel brakes of the vehicle. As illustrated in FIG. 1, this is accomplished by coupling a brake fluid line 17 from the vehicle brake system master cylinder (not shown) to an inlet 18 in wheel lock 10. Such coupling may be accomplished using a conventional hex-headed fitting 19. An outlet 20 from wheel lock 10 is connected by means of a similar fitting (not shown) to a brake fluid line 21 leading to one or more wheel brake cylinders of the associated vehicle.

Structural details of wheel lock 10 are evident in FIGS. 2, 3 and 4. Referring thereto, it may be seen that inlet 18 communicates with a central opening 22' in a valve seat 22 threadingly mounted and sealed within housing 11. Opening 22', in turn communicates with a chamber 23, the other end of which is connected via an opening 24 to outlet 20. The side walls of chamber 23 include one or more longitudinal grooves 23' which facilitate brake fluid flow around various components of a valve 25.

Cooperating with valve seat 22 as a component of valve 25 is a valve piston 26 typically fabricated of brake fluid resistant hard rubber such as ethylene propylene. Piston 26 is fixedly attached to one end of a piston rod 27. Attached to the other end of rod 27 is a flanged member 28. For simplicity of construction, piston rod 27 may be threaded, and member 28 may comprise a nut threaded onto rod 27 and peened to prevent relative motion between member 28 and rod 27.

Surrounding piston rod 27 is a generally cylindrical support 29 having an axial bore 30, the diameter of which is greater than the outer diameter of piston rod 27. Support 29 also includes a recess 31 within which is situated flanged end 28 of rod 27. With this arrangement, piston rod 27 is free to reciprocate or move longitudinally through bore in support 29.

A first spring 32 surrounds rod 27 and extends between support 29 and a member 33 threaded to rod 27 adjacent piston 26. Member 33 firmly retains one end of spring 32 and protects piston 26 from possibly being damaged by spring 32. Note that spring 32 biases piston 26 away from support 29, toward a position at which flanged end 28 abuts against support 29. A second spring 34 surrounds the piston rod assembly and extends between valve seat 22 and support 29. Spring 34 biases support 29 against the cam portion 36 of a camshaft 37.

As best seen in FIG. 2, camshaft 37 is disposed within chamber 23 generally perpendicular to piston rod 27. Camshaft 37 includes a first end 38 extending into a counterbore 39 in a member 40 threaded and sealed into housing 11. The exterior surface 40a of member 40 preferably is flush with the exterior of housing 11, so as to prevent tampering of wheel lock 10 by removal of member 40. A vent hole may be provided in member 40 to facilitate insertion of camshaft end 38 subsequent to mounting of seal 46. The other end 42 of camshaft 37 includes a recess 43 which receives a shaft 44 extending from lock 12 and operated by key 13. A pin 45 locks camshaft 37 to shaft 44.

A pair of high pressure resistant seals 46, 47 surround camshaft ends 38 and 42, respectively supported by shoulders in member 40 and housing 11. Seal 46 prevents brake fluid under pressure from getting behind camshaft end 38 and pushing it out of counterbore 39. Seal 47 prevents leakage of brake fluid between camshaft end 42 and housing 11. A pair of set screws 48 disposed within a pair of holes 49 maintain lock 12 in place. Holes 49 may be aup, as indicated generally at 48, to prevent removal of set screws 48.

Rotation of key 13 in lock 12 will cause concomitant rotation of camshaft 37 from the valve opening position shown in FIG. 2 to the valve closing position shown in FIGS. 3 and 4. In the valve opening position (FIG. 2), cam portion 36 of camshaft 37 is disposed toward the bottom 11a of housing 11. Spring 34 biases support 29 against cam portion 36, and support 29 in turn urges flanged end 28 and piston rod 27 toward camshaft 37, thereby opening valve 25. In this valve open condition in which piston 26 is spaced from valve seat 22, brake fluid can flow unimpeded between inlet 18 and outlet 20. Thus, with valve 25 open, the vehicle brake system operates normally.

To engage wheel lock 10, key 13 is rotated so as to bring cam portion 36 of camshaft 37 to the valve closing position shown in FIGS. 3 and 4. In this position, cam portion 36 is situated at the top of its travel, and urges support 29 upward toward valve seat 22. As a result, spring 32 is further compressed and urges member 33, rod 27 and piston 26 upward so as to seat piston 26 against valve seat 22. In this closed position, illustrated in FIG. 3, brake fluid flow from outlet 20 to inlet 18 is impeded completely by closed valve 25.

If camshaft 37 is turned to the valve closing position at a time when the vehicle brake pedal is not depressed, brake fluid in line 21 between wheel lock 10 and the wheel brake cylinders will not be under pressure, and the wheels will turn freely. To effectuate locking of the wheels, the vehicle brake pedal is depressed either simultaneous with or subsequent to positioning of camshaft 37 in the valve closing position. When the brake pedal is so depressed, brake fluid in line 17 from the system master cylinder will be under greater pressure than the brake fluid in line 21 between outlet 20 and the wheel brake cylinders.

This excess pressure at inlet 18 will cause valve 25 to open. That is, piston 26 and piston rod 27 will be forced downward with respect to support 29, as to the position illustrated in FIG. 4. During this travel of piston rod 27, flanged end 28 moves downward within recess 31 toward camshaft 37 which still is in the valve closing position. The force exerted by spring 32, which is compressed as piston 26 opens away from valve seat 22, determines in part the amount of excess brake fluid pressure necessary to open valve 25. In this regard, if the brake pedal is depressed enough to hold the vehicle at standstill, the pressure will be sufficient to open valve 25.

Once piston 26 moves to the position shown in FIG. 4, the pressure exerted by the brake system master cylinder is transmitted to the brake fluid in line 21 between wheel lock 10 and the wheel brake cylinders. As the pressure between inlet 18 and outlet 20 equalizes, bias spring 32 will urge piston 26 back toward valve seat 22. When the brake pedal next is released, reducing the brake fluid pressure in line 17 and at inlet 18, spring 32 and brake fluid under pressure on the outlet 21 side of valve 25 will exert force on the underside of piston 26, member 33 and flange end 28, forcing piston 26 firmly against valve seat 22. As a result, valve 25 will close, trapping brake fluid under pressure in line 21 between wheel lock 10 and the brake cylinders, thereby locking the wheels and preventing motion of the associated vehicle. Subsequent depression of the brake pedal will not alter this wheel-locked condition. The vehicle brakes will remain securely locked until wheel lock 10 is disengaged by (a) using key 13 to rotate camshaft 37 to the valve opening position shown in FIG. 2 and (b) depressing the vehicle brake pedal with force at least equal to the existing brake fluid pressure in line 21. This will cause valve 25 to open, permitting resumption of normal vehicle brake system operation.

Wheel lock 10 can be installed on wheeled vehicles of all types, including automobiles, trucks and aircraft having either hydraulic or pneumatic brake systems. The wheel lock works satisfactorily on vehicles having either standard or power-assisted brake systems with either disc or drum-type brakes. The wheel lock can be installed either in a single or a dual brake system. In a single brake system, one wheel lock can control all wheels of the vehicle; in a dual brake system, one wheel lock can control those wheel brakes associated with the brake fluid line in which the wheel lock is interposed.

Although not illustrated, an interlock switch actuated by rotation of camshaft 37, and cooperating with the vehicle ignition switch, may be used to prevent the owner from starting the vehicle while wheel lock 10 still is engaged.

Thus the inventive wheel lock 10 provides a significant deterrent to the theft of the vehicle in which it is installed. The device is simple, inexpensive, and completely safe in operation. Moreover the wheel lock is completely tamperproof; should an attempt be made either to disconnect or disassemble the device, the brake line would be opened, leaving the vehicle without brakes.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A device for locking one or more wheels of a vehicle having a fluid brake system, said device being adapted for connection in series with the brake fluid line between the system master cylinder and at least one wheel brake cylinder, said device comprising:

a housing having a brake fluid inlet and outlet and a single, elongated, fluid chamber connecting said inlet and said outlet, a camshaft disposed within said chamber in said housing for rotation about an axis transverse to the longitudinal axis of said chamber, said camshaft being disposed adjacent said outlet, a valve seat in said housing and in fluid communication with said inlet, said valve seat defining one end of said chamber, a valve piston disposed within said chamber and having first and second opposite faces, said valve piston being adapted to reciprocate between an open position spaced from said valve seat and a closed position with said first face against said valve seat, said open and closed positions respectively permitting and blocking fluid communication between said inlet and said outlet, a piston rod having one end thereof fixedly attached to a central portion of the second face of said valve piston and having a flanged opposite end, a generally cylindrical support positioned in said chamber and having an axial bore, said piston rod extending through said bore in said cylindrical support and being movable longitudinally thereof, said flanged end of said piston rod being disposed within a recess in one end of said cylindrical support, said one end of said cylindrical support being situated against the cam portion of said camshaft, a first bias spring positioned in said chamber surrounding said piston rod and extending between the other end of said support and said second face of said piston, and a second bias spring positioned in said chamber extending between said other end of said cylindrical support and said valve seat, whereby rotation of said camshaft urges said cylindrical support, said first bias spring and said valve piston toward said closed position, said valve piston and piston rod thereafter being movable longitudinally of said support to said open position when the pressure at said inlet exceeds that at said outlet, said valve piston returning to said closed position when said inlet pressure is relieved and thereafter remaining in said closed position to trap pressurized brake fluid between said device and said brake cylinder and thereby preventing said wheel from turning.

2. A device as defined in claim 1 further comprising a rotary, key-operated lock mounted in said housing and operatively connected to rotate said camshaft.

3. A device as defined in claim 1 further comprising a plurality of longitudinal grooves in the walls of said housing defining said fluid chamber for facilitating brake fluid flow through said chamber.

4. In a device for locking the wheels of a vehicle having a fluid brake system, said device including a housing having a single interior chamber communicating between an inlet connectable to the system master cylinder and an outlet connectable to at least one system wheel brake cylinder, a valve situated within said chamber for controlling brake fluid flow through said device, and a key-lock actuated camshaft within said housing and movable between a valve opening position and a valve closing position, the improvement wherein said valve comprises:

a valve piston for selectively opening or closing said inlet, said piston being attached to one end of a valve stem, an annular motion transmitting member surrounding said valve stem and adapted to reciprocate longitudinally thereof, a first spring surrounding said valve stem and biasing said motion transmitting member against said camshaft, said first spring being under relatively less compression when said camshaft is in said valve opening position than when said camshaft is in said valve closing position, means comprising an element projecting laterally from said valve stem and cooperating with said motion transmitting member for displacing said valve piston toward said camshaft to open said inlet, and a second spring surrounding said valve stem and disposed between said valve piston and said motion transmitting member for urging said valve piston to close said inlet when said camshaft is moved to said valve closing position, said spring being relatively uncompressed when said camshaft is in said valve closing position and said valve is closed, pressurized brake fluid trapped between said closed inlet and said wheel brake cylinder preventing the associated vehicle wheel from turning, said pressurized brake fluid also maintaining said piston in the inlet closing position.

* * * * *